United States Patent [19]

Kedem

[11] 4,424,885
[45] Jan. 10, 1984

[54] BRAKE ASSEMBLY FOR PALLET LIFT TRUCK

[75] Inventor: Tuval Kedem, Miami, Fla.

[73] Assignee: Equipment Company of America, Hialeah, Fla.

[21] Appl. No.: 296,103

[22] Filed: Aug. 26, 1981

[51] Int. Cl.³ .............................................. B60T 1/04
[52] U.S. Cl. ...................................... 188/22; 188/29
[58] Field of Search .................. 188/1.12, 21, 22, 29, 188/57, 68; 180/19.3; 280/43.12; 254/2 R, 2 B, 2 C

[56] References Cited

U.S. PATENT DOCUMENTS

| | | | |
|---|---|---|---|
| 2,738,034 | 3/1956 | Levine | 188/21 |
| 2,905,482 | 9/1959 | Ruttger | 188/22 |
| 3,074,516 | 1/1963 | Wood | 188/22 |
| 3,276,550 | 10/1966 | Honeyman | 188/29 |
| 3,360,082 | 12/1967 | Grubis | 188/29 |
| 3,462,167 | 8/1969 | Rateau | 280/43.12 |
| 3,486,587 | 12/1969 | Malloy | 188/29 |
| 3,532,188 | 10/1970 | Kelz | 188/21 |
| 3,666,285 | 5/1972 | Fertig | 188/22 |

FOREIGN PATENT DOCUMENTS 2127723 12/1972 Fed. Rep. of Germany ........ 188/29

*Primary Examiner*—Douglas C. Butler
*Assistant Examiner*—R. R. Diefendorf
*Attorney, Agent, or Firm*—Cullen, Sloman, Cantor, Grauer, Scott & Rutherford

[57] ABSTRACT

In a pallet lift truck having a base, an upright axle shaft, a wheel fork and a transverse axle mounting a pair of spaced resilient wheels, and a normally upright steering handle pivoted at one end to the base. A mechanical brake assembly comprises a brake housing with downwardly opening slots positionable over and removably mounted upon the axle between the wheels. An upright brake arm extends into and is pivotally mounted upon the brake housing and includes a brake bar projecting therefrom overlying and spaced from the wheels and normally biased to an inoperative position. A brake actuator boss upon the steering handle on downward pivoting thereof operatively engages the brake arm moving the brake bar into operative compressive frictional engagement with the wheels.

9 Claims, 6 Drawing Figures

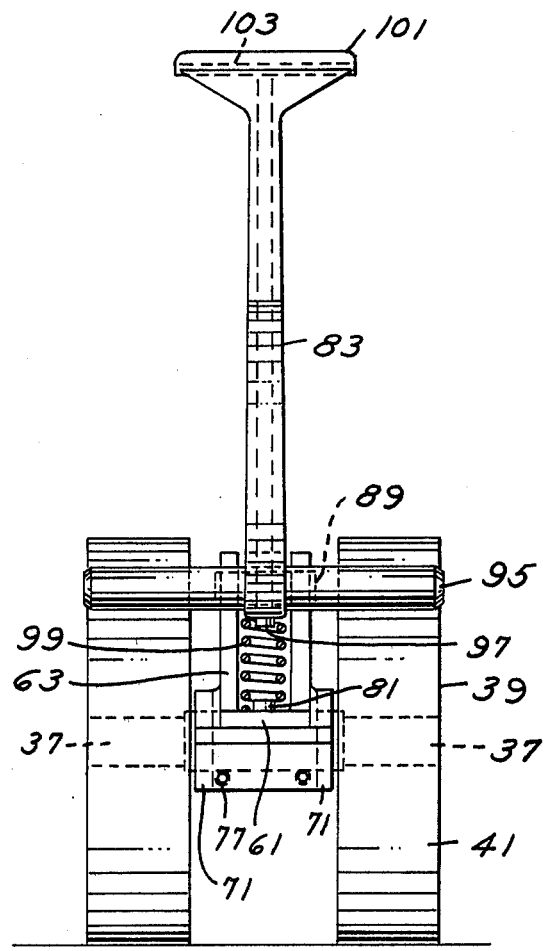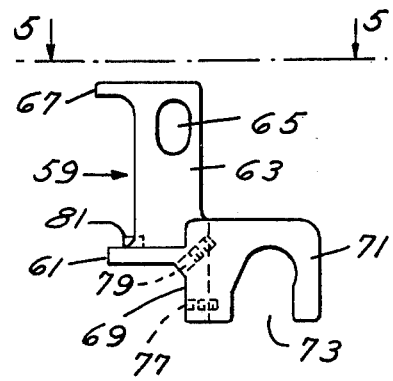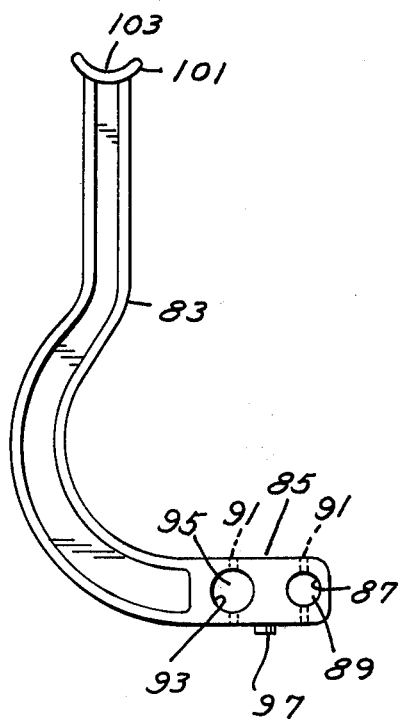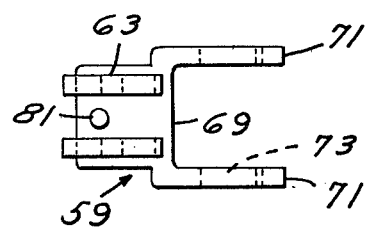

BRAKE ASSEMBLY FOR PALLET LIFT TRUCK

RELATED APPLICATION

The present brake assembly is adapted for use in conjunction with a pallet lift truck such as disclosed in Applicant's copending U.S. Pat. application entitled "Pallet Truck With Hydraulic Lift", Ser. No. 313,411, filed Oct. 26, 1981.

BACKGROUND OF THE INVENTION

1. Field of the Invention

The brake assembly is adapted to be used on a pallet lift truck.

2. Description of the Prior Art

In the use of certain pallet lift trucks a safety problem could occur when a loaded pallet lift truck is located upon an inclined surface or a ramp or where the truck supports extra heavy loads. There is a possibility of accidental or unintended movement of the loaded truck such as might result in injury to a person or damage to property.

Pallet lift trucks of the type disclosed herein are shown in one or more of the following prior art U.S. patents:

| Klumb | 3,119,627 | 1/28/64 |
| --- | --- | --- |
| Quayle | 3,188,107 | 6/8/65 |
| Edira | 3,286,985 | 11/2/66 |
| Best | 3,608,922 | 9/28/71 |
| Best | 3,701,211 | 10/31/72 |
| Bryntse | 3,940,338 | 2/24/76 |
| Sugiura | 3,817,546 | 6/18/74 |
| Brassington | 3,567,240 | 3/2/71 |
| Quale | 2,309,138 | 1/26/43 |
| Rateau | 3,462,167 | 8/19/69 |
| Fredericson | 3,843,147 | 10/22/74 |

SUMMARY OF THE PRESENT INVENTION

An important feature of the present invention is to provide for a pallet lift truck, a mechanical brake assembly, which may be easily and removably mounted upon the axle supporting the conventional pair of rear wheels of such truck.

Another feature of the invention is to provide a brake assembly for a pallet lift truck having a base plate with a depending axle shaft mounting a wheel fork carrying a transverse axle assembly for supporting a pair of spaced resilient wheels and a normally upright steering handle pivoted at one end upon the base plate. In such a construction the mechanical brake assembly comprises a brake housing which includes a pair of laterally spaced upright stirrups having downwardly opening slots which are removably positionable over and upon the axle between the wheels.

A further feature of the invention is to pivotally mount upon the brake housing a brake arm of L-shape configuration. The brake arm mounts a brake bar adjacent and outwardly of its pivotal mounting. The brake bar is arranged transversely to overlie the wheels and is spaced from the wheels when in an inoperative position. A brake actuator boss provided on the steering handle outwardly of its pivotal mounting is normally spaced from the upper end of the brake arm and is adapted on a pivotal downward movement of the steering handle to operatively engage the brake arm for moving the brake bar into operative frictional compressive retaining engagement with the wheels of the pallet lift truck.

A still further feature of the invention involves the ease with which the entire brake assembly may be easily and quickly mounted upon the wheel axis, between the wheels of a pallet lift truck and with a simple adjustment retained in such position.

Another feature of the invention is the provision of a brake housing which as a unit provides a means for easily removably mounting the housing upon the wheel axle and which provides a means for pivotally mounting the brake arm carrying the brake bar, wherein upon downward pivotal movement of the steering handle, the boss carried thereby is adapted to axially engage the free end of the brake arm for moving it downwardly and its connected brake bar into operative frictional engagement with the wheels of the pallet lift truck.

These and other features will be seen from the following specification and claims in conjunction with the appended drawings.

BRIEF DESCRIPTION OF THE DRAWINGS

FIG. 3 is an end elevational view of the brake assembly of FIG. 2 showing the brake assembly as mounted upon the wheel axle.

FIG. 4 is a side elevational view of the brake housing shown in FIG. 2.

FIG. 5 is a plan view of the brake housing taken in the direction of arrows 5—5 of FIG. 4.

FIG. 6 is a side elevational view of the brake arm shown in FIG. 2.

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Figure 1:
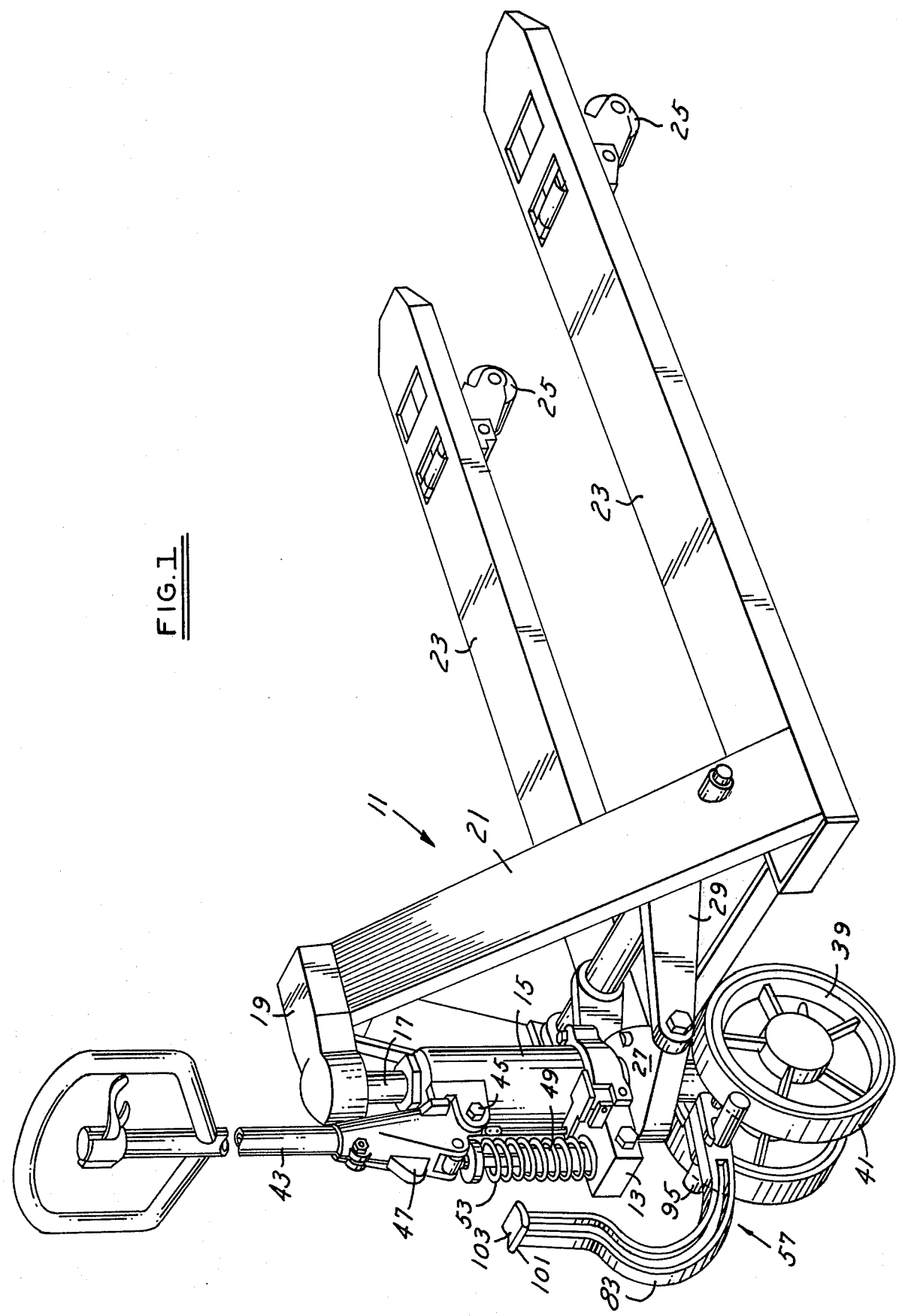
FIG. 1 is a rear side perspective view of a pallet lift truck to which the present mechanical brake assembly has been applied.

Referring to the drawings and particularly FIG. 1, a pallet lift truck is generally indicated at 11 having base plate 13 and mounted upon one end thereof the upright oil reservoir 15 within which is positioned, though not shown, a lift cylinder from which projects reciprocal piston rod 17.

Stop cap 19 overlies the piston rod 17 and is connected to and forms a part of the A frame 21, from the lower end of which projects a pair of spaced forks 23 whose forward ends mount the retractable rollers 25.

Underlying the base plate 13 and extending transversely is a trunnion 27 at its ends pivotally connected to the frame 21 as by the control arms 29 and centrally and rotatably mounted upon axle shaft 31 which depends from and is secured to base plate 13 substantially in alignment with piston rod 17.

Axle shaft 31 at its lower end pivotally mounts at 35 the wheel fork 33 which carries and supports the transverse wheel axle 37 upon which are mounted and journaled a pair of resilient wheels 39 whose rims 41 are preferably constructed of some resilient material such as polyurethane. The assemblies 39 and 41 are hereafter referred to as the resilient wheel.

The lift truck 11 shown in FIG. 1 includes the normally upright steering handle 43 which at its lower end is pivotally mounted upon an upper portion of reservoir 15 mounted on base plate 13. Since the reservoir 15 is fixedly secured to the base plate 13, the pivot mounting of the steering handle 43 may hereafter be referred to as mounted upon the base plate 13, in the manner shown in FIG. 1.

There is mounted upon the steering handle 43 adjacent and spaced outwardly of its pivot mounting 45, the brake boss 47, which in the position shown in FIG. 1 is spaced from brake assembly 57.

Figure 2:
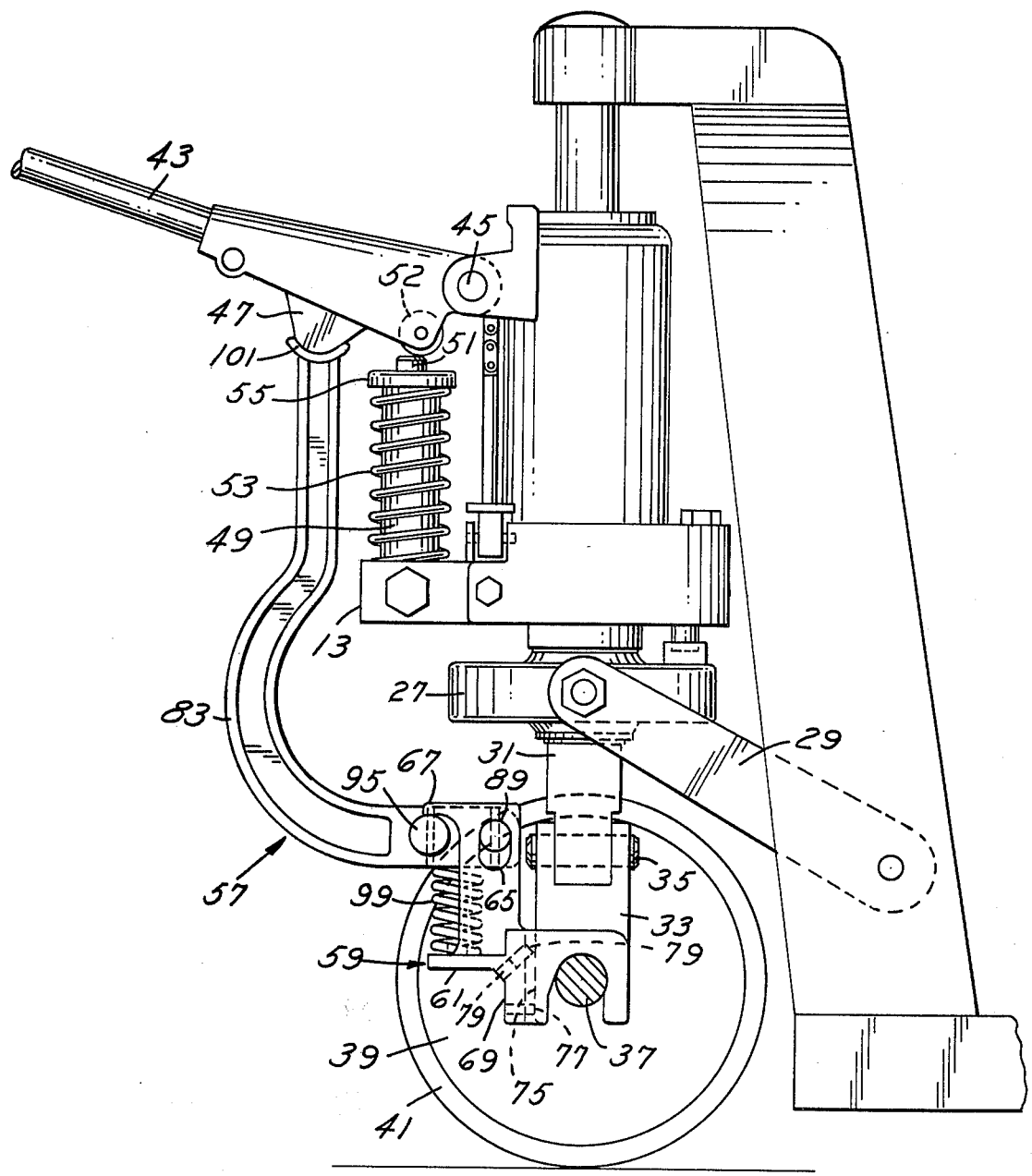
FIG. 2 is a side elevational view of the rear portion of the truck shown in FIG. 1 illustrating the construction of the mechanical brake assembly, on an increased scale.

Parallel to and rearwardly of reservoir 15 and also mounted and secured upon base plate 13 is the upright pump cylinder 49 with the reciprocal piston 51, FIG. 2 projecing therefrom and at its upper end retaining the spring cap 55. A suitable compression spring is interposed between spring cap 55 and the base plate 13 normally biasing the pump piston rod 51 to the uppermost retracted position, in FIG. 1.

In the operation of the steering handle 43 for the purpose of a pumping action with respect to the pump piston 51 and pump cylinder 49 the steering arm or handle 43 has been rotated counterclockwise about its pivot 45 to the position fragmentarily shown in FIG. 2. The roller 52 mounted upon steering handle 43 is adapted for operative downward compressive engagement with piston rod 51, depressing the piston rod 51 and compressing spring 53 such as to the position shown.

There is shown in FIG. 1, though not separately designated, a control lever at the upper end portion of the steering handle 43 which as described in the copending application has a neutral position so that the pivotal braking action of the steering handle 43 will not interfere with its pumping action. Pump or pump cylinder 49 and the associated lift cylinder and piston rod 17 are provided for controlling vertical adjustments of the frame 21 and the retractable rollers 25 for forks 23, all as disclosed in my aforementioned copending application directed to the construction of a pallet truck provided with a hydraulic lift system.

Suffice it to say the steering handle 43 is pivotally mounted at 45 upon the reservoir 15 and therefore, indirectly mounted upon the base plate 13, and assumes a normal upright position shown in FIG. 1 under the action of coil spring 53.

The present mechanical brake assembly is generally indicated at 57, FIGS. 1 and 2 and may be removably assembled upon the wheel axle 37, in a very short period and into the use position shown without in any manner effecting the use and operation of the pallet lift truck resilient wheels 39.

The present brake assembly 57 includes a unit brake housing 59 of a suitable casting such as shown in FIGS. 4 and 5 and has a flat base 61, and projecting thereabove and secured thereto a pair of upright side plates 63 with opposed elongated slots 65 formed therethrough. Upper edges of the side plates 63 terminate in the rearwardly extending top flanges 67 which project rearwardly of the side plates 63 to overlie a portion of the brake bar 95.

Forming a part of the brake housing 59 is the upright end plate 69 which extends at right angles to the base 61, spans and is arranged at right angles to the upright stirrups 71. Each of the stirrups 71 have formed therein the elongated downwardly opening axle slots 73 adapted to be removably positioned over the wheel axle 37 between the resilient wheels 39.

As shown in FIG. 2, on positioning of the brake housing 59 over the axle 37, the upright end plate 69 is adjacent to front wall 75 of the wheel fork 33. A first pair of laterally spaced socket head set screws 77 are threaded through end plate 69 and are adapted for operative engagement with front wall 75 of the wheel fork 33. Ad additional pair of laterally spaced upwardly inclined socket head set screws 79 are threaded through the brake housing 59 at the juncture between the base 61 and end plate 69 and are adapted for operative retaining engagement with the portions of the front wall 75 of the wheel fork 33.

The fasteners or set screws 77 and 79 provide a means of anchoring the brake housing 59 with respect to the wheel fork 33 after the brake housing 59 has been assembled over the axle 37. It is this adjustment of the set screws 77 and 79, which takes a very short period, such as a minute or so in order to provide a limited securing of the brake housing 59 and the respective parts assembled thereon.

Centrally positioned upon and projecting from base 61 is the spring anchor stud 81 adapted to receive the lower end of the coil compression spring 99. The brake arm 83 is generally of L-shape configuration and includes a lower or pivot end 85 which projects into brake housing 59 between side plates 63. Transverse brake axle 89 extends through aperture 87 in the pivot end 85 of the brake arm 83 and projects from opposite sides thereof as shown in FIG. 3. Axle 89 is adjustably and movably positioned within the upright opposed slots 65 within side plates 63 of the brake housing 59. This therefore provides a yieldable pivot mounting for the brake arm 83 with respect to the brake housing 59. The transverse spring pin 91 (FIG. 6) projects through the brake arm 83 and through the brake axle 89 for securing the axle 89 in position relative to the brake arm 83.

Spaced outwardly of the brake axle 89 there is provided a transverse cylindrical brake bar or rod 95 which projects through the transverse aperture 93 formed within the pivot end 85 of the brake arm 83 so as to project from opposite sides thereof. Bar 95 is also anchored by a spring pin 91 (FIG. 6) which extends through the pivot end 85 of the brake arm 83 and through bar 95.

Brake bar 95, as shown in FIG. 3, projects laterally so as to overlie and be normally spaced from resilient wheels 39-41 FIG. 2. Underlying pivot end 85 of the brake arm 83 is the depending spring centering and receiving stud 97 normally in registry with stud 81 between which is interposed in compression the coiled brake spring 99, FIGS. 2 and 3.

The coiled brake spring 99 provides the biasing means by which the brake bar 95 when in its normal retracted or inoperative position is spaced from the surface of the compressive yieldable and resilient pallet truck wheels 39. In such position shown in FIG. 2, the rearwardly extending top flanges 67 upon the brake housing 59 overlie and retainingly engage a portion of the brake bar 95 for limiting its upward movements with respect to the brake housing 59. Thus, in the normal operation of the pallet lift truck 11, the brake bar 95 is spaced from the wheels, FIG. 2.

Upon the upper end of and secured to the brake arm 83 forming a part thereof is the transversely extending brake arm actuator 101 which has along its top surface the concave channel 103. The channel 103 is adapted to cooperatively receive the brake boss 47 on the steering handle 43 when the handle has been pivoted to the position shown in FIG. 2.

FIG. 2 illustrates the brake bar 95 spaced from the resilient wheels 39. Thus, some small additional manual movement of the steering handle 43 in a counterclockwise direction will apply an axial downward thrust to the brake arm 83 pivoting the arm 83 about its yieldable pivot axle 89 downwardly sufficiently so that the brake bar 95 is in operative compressive and frictional retaining engagement with the resilient wheels 39 completing the braking action. Manual release of the steering handle 43 will permit the brake arm 83 to move to its inoperative retracted position under the action of the coil spring 99.

Since the steering handle 43 is still under the bias of the pump spring 53, the spring 53 is adapted to return the steering arm 43 to the upright normal position, FIG. 1.

Brake arm 83 is yieldably and pivotally mounted within the brake housing 59 by transverse brake axle 89 movably positioned with the opposed elongated side wall slots 65 of brake housing 59.

By the present construction, the mechanical brake assembly 57 is quickly and easily positioned upon the wheel axle 37 and retained thereon merely by adjusting the respective set screws 77 and 79 and is similarly easily removed by loosening the set screws.

Having described my invention, reference should now be had to the following claims:

I claim:

1. A brake assembly for a pallet lift truck having a base plate, a depending axle shaft having a wheel fork mounting an axle journaling a pair of spaced resilient wheels, and a normally upright steering handle pivoted at one end upon said base plate;

said brake assembly comprising a brake housing including a pair of laterally spaced upright stirrups having downwardly opening slots positionable over and upon the axle between the wheels;

a normally upright brake arm of L-shape with one end projected into said housing and pivotally mounted thereon;

a brake bar secured to and projecting from opposite sides of said brake arm adjacent and outwardly of its pivotal mounting transversely overlying and spaced from the wheels when in inoperative position;

first spring means within said housing bearing against and normally biasing said brake arm and bar to said inoperative position;

a brake actuator boss upon said steering handle outwardly of its pivotal mounting spaced from the other end of said brake arm;

and said steering handle operatively engageable with said other end of said brake arm on manual downward pivotal movement of said steering handle for moving said brake bar against the force of said first spring means into operative frictional compressive retaining engagement with the wheels.

2. The brake assembly of claim 1, sadi brake housing including an upright end plate interconnecting the inner ends of said stirrups operatively and supportably engageable with the wheel fork.

3. The brake assembly of claim 2, a plurality of set screws threaded through said end plate operatively and retainingly engageable with the wheel fork for anchoring said housing relative to the wheel fork.

4. The brake assembly of claim 1, said housing having a pair of upright side plates with upright opposed slots therethrough;

the pivotal mounting of said brake arm including a brake axle secured to and projecting from opposite sides of said brake arm at its one end guidably projected into said side plate slots;

said brake axle being movable within said slots;

5. The brake assembly of claim 4, rearwardly extending stop flanges projecting from the upper ends of said side plates, overlying said brake bar to limit upward movements of said brake arm to its inoperative position.

6. The brake assembly of claim 1, a brake arm actuator secured upon said other end of said brake arm extending upon opposite sides thereof and transversely concave, cooperatively receiving said brake actuator boss when the steering handle is manually rotated downwardly.

7. The brake assembly of claim 1, an upright second spring means upon said base plate interposed in compression between said base plate and steering handle normally biasing the steering handle to an upright position.

8. The brake assembly of claim 1, said brake housing including a base;

the first spring means biasing said brake arm including a coil spring upon said base interposed in compression between said base and said brake arm.

9. The brake assembly of claim 8, oppositely directed aligned spring anchoring studs upon said base and the undersurface of said brake arm respectively cooperatively receiving opposite ends of said spring.

* * * * *